United States Patent [19]

Bogdan et al.

[11] Patent Number: 5,617,238
[45] Date of Patent: Apr. 1, 1997

[54] AUTOMATED SYSTEM, AND CORRESPONDING METHOD, FOR MEASURING TRANSMITTER DUTY CYCLE DISTORTION OF ELECTRO-OPTIC MODULES

[75] Inventors: David C. Bogdan, Vestal; Donald L. Pearl, Endwell; David T. Pribula, Port Crane, all of N.Y.

[73] Assignee: International Business Machines Corporation, Armonk, N.Y.

[21] Appl. No.: 450,940

[22] Filed: May 23, 1995

Related U.S. Application Data

[62] Division of Ser. No. 13,460, Feb. 4, 1993, Pat. No. 5,546,325.

[51] Int. Cl.[6] .............. H04B 10/08; H04B 10/04
[52] U.S. Cl. .............. 359/180; 359/110; 364/486
[58] Field of Search ................ 359/110, 180, 359/184; 356/73.1; 364/481, 486, 487

[56] References Cited

U.S. PATENT DOCUMENTS

| | | | |
|---|---|---|---|
| 5,041,997 | 8/1991 | Hernday et al. | 356/73.1 |
| 5,175,492 | 12/1992 | Wong et al. | 364/551.01 |
| 5,220,581 | 6/1993 | Ferraiolo et al. | 375/10 |
| 5,452,333 | 9/1995 | Guo et al. | 375/371 |

*Primary Examiner*—Leo Boudreau
*Assistant Examiner*—Bhavesh Mehta
*Attorney, Agent, or Firm*—Baker, Maxham, Jester & Meador

[57] ABSTRACT

An automated, computer-controlled system automatically measures various parameters associated with the transmitter and/or receiver of an electro-optic module. Measured transmitter parameters include transmitter average power, transmitter rise/fall time, transmitter extinction ratio, transmitter duty cycle distortion, and transmitter data dependent jitter. Measured receiver parameters include receiver sensitivity, receiver pulse width distortion, receiver signal detect threshold, and receiver signal detect assert/deassert times.

3 Claims, 3 Drawing Sheets

AUTOMATED SYSTEM, AND CORRESPONDING METHOD, FOR MEASURING TRANSMITTER DUTY CYCLE DISTORTION OF ELECTRO-OPTIC MODULES

This is a divisional of application Ser. No. 08/013,460 filed on Feb. 4, 1993, now U.S. Pat. No. 5,546,325.

BACKGROUND OF THE INVENTION

1. Field of the Invention

The invention pertains to an automated system, and to a corresponding method, for testing electro-optic modules.

2. Description of the Related Art

Those engaged in the manufacture and use of communication systems, e.g., systems for communicating voice, video and/or data, have become increasingly interested in using fiber optic cables as transmission media in such systems. This interest is stimulated by the fact that the potential bandwidth (or information-carrying capacity) of optical fibers is extremely high. In addition, communication systems employing fiber optic cables are resistant to electromagnetic interference, which sometimes plagues systems employing electrical cables as transmission media. Moreover, communication systems employing fiber optic cables are considered more secure than systems employing electrical cables because it is generally more difficult for unauthorized personnel to tap or access a fiber optic cable without being detected.

An exemplary communication system employing a fiber optic cable as a transmission medium is one which includes, for example, two or more computers, with each adjacent pair of computers being interconnected by a fiber optic cable which includes two optical fibers, i.e., a transmit optical fiber and a receive optical fiber. Obviously, each computer generates and receives information, i.e., data, in electrical form. Consequently, each computer is also provided with an electro-optic module, typically mounted on a printed circuit board or printed circuit card of the computer, which converts the electrical signals generated by the computer into optical signals, which are transmitted to the adjacent computer via the transmit optical fiber. In addition, the electro-optic module converts optical signals communicated to the computer via the receive optical fiber into corresponding electrical signals.

An electro-optic module, of the type referred to above, necessarily includes an electro-optic transmitter and an electro-optic receiver. That is, such a module typically includes a housing containing a transmitter optical subassembly (TOSA), a receiver optical subassembly (ROSA) and a pinned ceramic substrate bearing a number of semiconductor integrated circuit devices. Certain of these integrated circuit devices perform transmitter-related functions (and are hereinafter denoted the transmitter ICs) and certain of these integrated circuit devices perform receiver-related functions (and are hereinafter denoted the receiver ICs). The TOSA, which is electrically connected to the transmitter ICs, includes an electro-optic transducer, such as a semiconductor laser or a light-emitting diode (LED), which serves to convert the digital electrical signals generated by the transmitter ICs into corresponding digital optical signals. It is the combination of the TOSA and transmitter ICs which constitutes the transmitter of the module. Similarly, the ROSA, which is electrically connected to the receiver ICs, includes an electro-optic transducer, such as a PIN photodiode, which serves to convert received digital optical signals into corresponding digital electrical signals communicated to the receiver ICs. It is the combination of the ROSA and receiver ICs which constitutes the receiver of the module.

The electrical data communicated by a computer to its electro-optic module is typically communicated in parallel form, whereas the transmitter of the electro-optic module is only capable of receiving electrical data, and producing corresponding optical data, in serial form. Consequently, the printed circuit board or printed circuit card on which the module is mounted usually includes a so-called serializer semiconductor integrated circuit device, which serves to convert parallel electrical data into serial electrical data. Similarly, the receiver of the electro-optic module is only capable of receiving optical data in serial form, and of converting it into corresponding serial electrical data, whereas this electrical data is to be communicated to the computer in parallel form. Therefore, the printed circuit board or printed circuit card on which the module is mounted usually includes a so-called deserializer semiconductor integrated circuit device, which serves to convert serial data into parallel data.

A communication system employing fiber optic cables and electro-optic modules can only operate effectively if its components, including its electro-optic modules, operate in conformity with corresponding operating specifications. Therefore, it has become important to test electro-optic modules to make sure that these modules conform to these specifications, and to detect and correct errors in manufacturing processes which lead to non-conformities in the modules.

The operating specifications, referred to above, typically impose limitations on certain parameters which characterize the performance of a transmitter and of a receiver of an electro-optic module. For example, the transmitter is usually characterized by parameters such as transmitter average power, transmitter rise/fall time, transmitter extinction ratio, transmitter duty cycle distortion and transmitter data dependent jitter, all of which parameters are defined below in connection with the present invention. In addition, the receiver is usually characterized by parameters such as receiver sensitivity, receiver pulse width distortion, receiver signal detect threshold and receiver signal detect assert/deassert times, which parameters are also defined below. Significantly, until the present invention, the tests devised to measure these parameters have all been manual and have therefore required an inordinate amount of time to perform. For example, if one were to manually measure all of the parameters listed above, then this would typically require several hours. As a consequence, it has thus far been impractical and prohibitively expensive, for example, for a manufacturer of electro-optic modules to test each and every electro-optic module manufactured by him, or even a statistically significant fraction of such modules, in order to weed out those which fail to conform to the corresponding specification.

To illustrate the above point, it should be noted that in order to measure, for example, receiver sensitivity, using conventional manual techniques, it is first necessary to manually determine the corresponding eye pattern. That is, a digital electrical serial pattern generator (a type of digital signal generator), having an internal clock, is electrically connected to a semiconductor laser or LED which is optically connected to the receiver under test via an optical fiber. The output of the receiver is, in turn, electrically connected to a digital oscilloscope. In addition, the output of the internal clock of the serial pattern generator is electrically connected, through a manually adjustable time delay unit, to the same digital oscilloscope. The serial pattern generator is then used to transmit a pseudo-random digital electrical signal to the semiconductor laser or LED, at a transmission speed (bit rate) to be used in the corresponding communication system. The semiconductor laser or LED produces a corresponding pseudo-random digital optical signal, which is communicated to the receiver via the optical fiber. In addition, the resulting pseudo-random digital electrical signal generated by the receiver is communicated to the digital oscilloscope, which is triggered by the square-wave clock pulses generated by the internal clock of the serial pattern generator. The transmission speed (bit rate) of these square wave pulses is, of course, the same as that of the pseudo-random digital electrical signal.

As each clock pulse triggers the digital oscilloscope, that portion of the pseudo-random digital electrical signal which is produced by the receiver and is subsequent to the triggering pulse is displayed on the oscilloscope and superimposed on previously displayed portions. By adjusting the oscilloscope to display only a segment of the superimposed digital signals corresponding to the width of a single electrical pulse, a pattern of voltage crossings, like that shown in FIG. 1, is produced. This pattern, called an eye pattern, depicts the number of voltage changes associated with the pseudo-random digital electrical signal produced by the receiver. It should be noted that the width of the eye pattern is related to the time interval during which each pulse in the pseudo-random digital signal being produced by the receiver may be sampled without error, i.e., the wider the eye pattern, the longer the time interval, and vice versa. This is important in connection with the deserializer semiconductor integrated circuit device mounted on the printed circuit board or printed circuit card because this device is typically only capable of sampling the electrical pulses produced by the receiver over a particular time interval and, to avoid errors, the width of the eye pattern should be equal to or greater than this deserializer time interval.

When considering receiver sensitivity, it should be understood that this term denotes the average power of the weakest optical signal the receiver can detect and maintain a specified bit error rate (BER). Thus, receiver sensitivity could, in principle, be measured by adding a digital electrical serial pattern comparator to the apparatus described above, which comparator is capable of comparing the pseudo-random digital electrical signal produced by the receiver to that generated by the serial pattern generator, and counting the number of bits which are in error, while varying optical power. That is, one could connect the electrical output of the receiver to the serial pattern comparator, connect the electrical output of the internal clock of the serial pattern generator to the serial pattern comparator and manually adjust the time delay unit to the setting corresponding to the center of the eye pattern. Then, at a specified average optical power of the laser or LED, one could accumulate a sufficient number of bits and count the corresponding number of bits which are in error. If the desired BER is not achieved, one could then increase or decrease the optical power and repeat the above procedure. However, if it is necessary to achieve a BER of, for example, $10^{}-12$ or $10^{}-15$ (as is now required in many computer systems), then one must necessarily accumulate at least $10^{}12$ or $10^{}15$ bits, which could easily take hours or days.

To reduce the amount of time required to measure receiver sensitivity, it is conventionally assumed that the noise in the receiver is Gaussian in nature and, for a fixed temperature, is constant. As a consequence, it follows that a signal-to-noise parameter, Q, associated with the receiver increases linearly with received average optical power, P (expressed in milliwatts), where $$Q = \frac{|\text{receiver decision threshold level} - \text{mean of signal level}|}{\text{standard deviation of signal level}} \quad (1)$$

Stated alternatively, it follows that the log (base 10) of Q is linearly proportional to P, expressed in decibels (dB), as depicted in FIG. 2. It also follows from the above assumptions, and it has been believed, that the slope of logQ versus P (expressed in dB) is equal to 0.0946 dB$^{**}-1$ for values of logQ ranging from about 0.677 to about 0.847. Moreover, it follows that BER is related to Q through the complementary error function, i.e., $$BER = \frac{1}{\sqrt{2\pi}} \int_Q^\infty e^{-x^2/2} dx. \quad (2)$$

Thus, if BER has been measured at a particular value of P, one can then calculate the corresponding value of Q from Equation (2). Furthermore, with this one data point, one can then obtain a plot of logQ versus P (expressed in dB) by extrapolation, using the above-mentioned slope.

Conventionally, to save time, when manually measuring receiver sensitivity, one uses the above-described apparatus to measure the BER corresponding to a relatively low average optical power, P. Because P is relatively low, it follows that the BER will be relatively high, e.g., $10^{}-8$, and therefore it is only necessary to accumulate a relatively small number of bits, e.g., $10^{}8$, which requires a relatively short period of time. Using Equation (2), it is then conventional to calculate the corresponding value of Q and, based upon the assumption that the slope of logQ versus P (in dB) is 0.0946 dB$^{**}-1$, obtain a plot of logQ versus P (in dB) for the receiver under test. To determine the power level needed to achieve a desired BER, one then solves Equation (2) for the corresponding value of Q. Using this value of Q, it is then conventional to use the plot of logQ versus P (in dB) to determine the corresponding value of P.

Using the time-saving procedure described above, a manual measurement of receiver sensitivity still requires about thirty (30) minutes. Unfortunately, this is far too long to permit each and every electro-optic module to be tested. In fact, this is far too long to permit even a statistically significant number of modules to be tested.

Thus, those engaged in the development and manufacture of fiber optic communication systems, in general, and of electro-optic modules, in particular, have long sought, thus far without success, systems and methods for testing electro-optic modules which require relatively short testing times.

SUMMARY OF THE INVENTION

The invention involves an automated, computer-controlled system, and a corresponding method, for testing electro-optic modules. This system is capable of automatically measuring various parameters associated with the transmitter and/or receiver of an electro-optic module. These parameters include transmitter average power, transmitter rise/fall time, transmitter extinction ratio, transmitter duty cycle distortion and transmitter data dependent jitter. These parameters also include receiver sensitivity, receiver pulse width distortion, receiver signal detect threshold and receiver signal detect assert/deassert times. The automated system is readily capable of measuring all of these parameters in no more than about three (3) minutes. As a consequence, it is now possible for a manufacturer of electro-optic modules to test each of his manufactured modules, or a statistically significant number of modules, in a relatively short period of time, e.g., three (3) minutes, and at a relatively low cost.

BRIEF DESCRIPTION OF THE DRAWING(S)

The invention is described with reference to the accompanying drawings, where:

DETAILED DESCRIPTION OF THE PREFERRED EMBODIMENT(S)

The invention involves an automated, computer-controlled system, and a corresponding method, for testing electro-optic modules. Significantly, the inventive system and inventive method permit electro-optic modules to be tested in relatively short time periods, e.g., three (3) minutes, and at relatively low cost.

Figure 3:
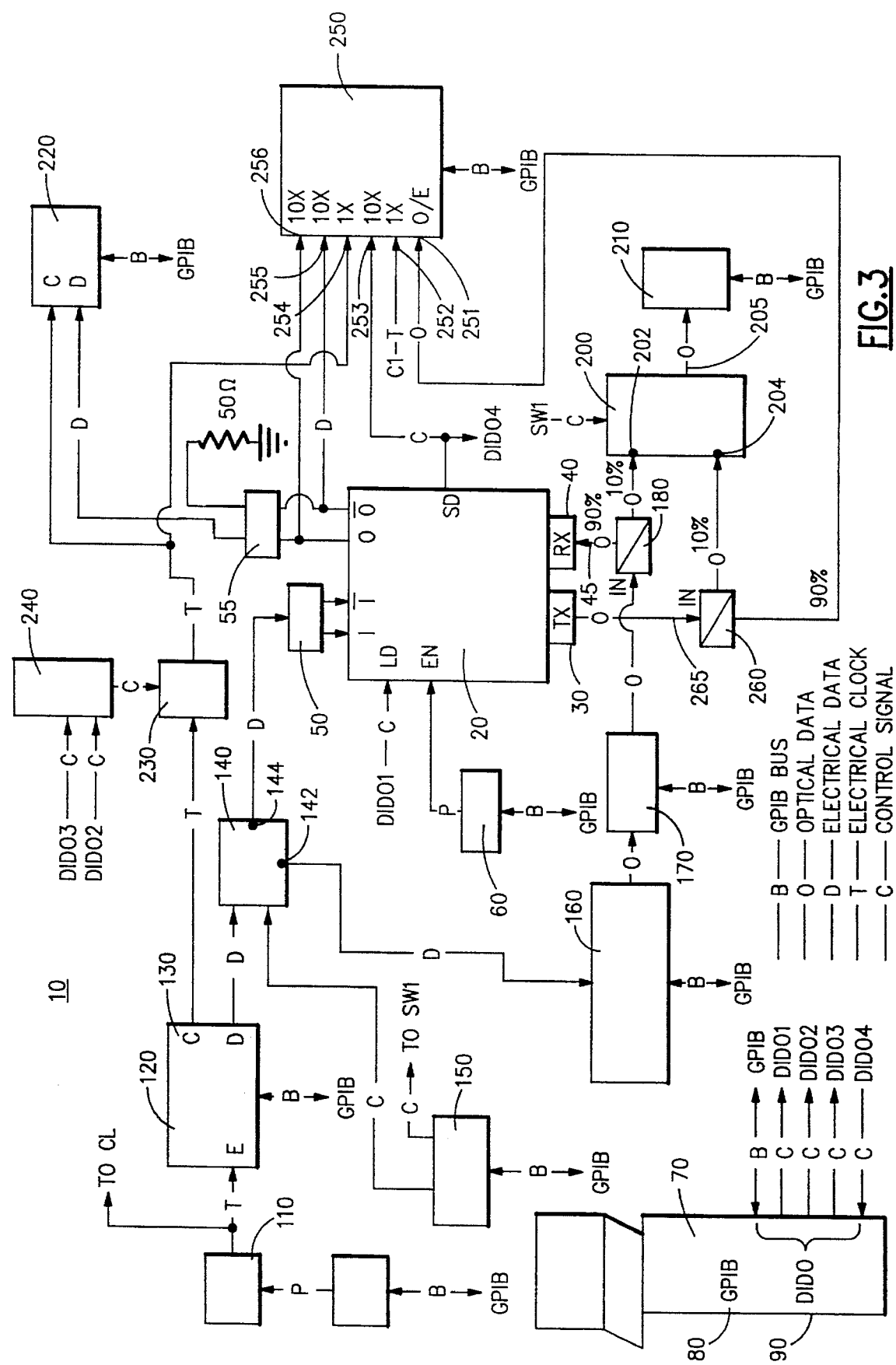
FIG. 3 is a schematic diagram of a preferred embodiment of the automated, computer-controlled system of the present invention.

A preferred embodiment of the inventive, automated, computer-controlled system 10 is depicted in FIG. 3 and is useful for measuring a variety of parameters (more fully described below) associated with an electro-optic module 20 (which is not an integral part of the system 10) to be tested. It is assumed that the module 20 includes either a transmitter 30, or a receiver 40, or both, as depicted in FIG. 3.

It should be noted that like most such electro-optic modules, it is also assumed that the transmitter and receiver ICs of the module 20 employ emitter-coupled logic, and therefore it is assumed that the input to the transmitter ICs of the module 20 must be a differential input while the output from the receiver ICs of the module 20 is also a differential output. That is, it is assumed that the input to the transmitter ICs is a combination of an input signal (denominated I in FIG. 3) and an inverted form of that same input signal (denominated I-bar in FIG. 3), while the output of the receiver ICs is a combination of an output signal (denominated O in FIG. 3) and an inverted form of that same output signal (denominated O-bar in FIG. 3). However, the components of the inventive system 10 employ single inputs rather than differential inputs. Consequently, the system 10 includes a single input-differential output emitter-coupled logic driver 50 (which is omitted if unnecessary) which serves to convert single inputs to the transmitter ICs of the module 20 into differential inputs. In addition, the system 10 includes an emitter-coupled logic driver 55 which serves to buffer the receiver ICs of the module 20 for communication to other system components. One useful emitter-coupled logic driver 50,55 is emitter-coupled logic driver model number 100114 sold by the Signetics company of Sunnyvale, Calif.

Significantly, as depicted in the lower left-hand corner of FIG. 3, the system 10 includes an electronic personal computer (PC) 70, such as a PC sold by the International Business Machines Corporation (IBM) under the trademark PS/2, and preferably the mod 80 version of this particular PC. In the operation of the inventive system, a computer program associated with the invention, described below, is loaded into the PC 70, which then serves to control the various components of the system 10.

The PC 70 sends commands to, and receives information from, almost all of the components of the system 10 through a general purpose interface bus 80, such as bus model number MC-GPIB sold by the National Instruments company of Austin, Tex. However, certain control signals are communicated by the PC 70 to certain components of the system 10 through a so-called data in/data out bus 90, such as bus model number MC-DIDO-32F sold by the National Instruments company, as more fully described below.

In connection with the electro-optic module 20 to be tested, it should be noted that the inventive system 10 includes a programmable power supply 60, such as programmable power supply model number 6624A sold by the Hewlett-Packard company of Santa Clara, Calif., which serves to provide power to the module 20 during testing. This power supply 60 communicates with the PC 70 via bus 80. It should also be noted that the PC 70 transmits enabling control signals (denominated DIDO 1 in FIG. 3) to the transmitter 30 of module 20 via bus 90. Moreover, if the module 20 includes a pinned ceramic substrate on which are mounted the transmitter ICs and the receiver ICs, as is conventional, then one of the substrate pins is usually dedicated to providing a voltage signal indicative of the fact that an input signal to the receiver 40 is below the receiver threshold level. In such an event, this voltage signal (denominated DIDO 4 in FIG. 3), called the receiver signal detect threshold signal, is communicated to the PC 70 via the bus 90.

As depicted in the upper left hand corner of FIG. 3, the inventive system 10 includes a programmable power supply 100, such as programmable power supply model number 6624A sold by the Hewlett-Packard company. This power supply 100, which communicates with PC 70 via bus 80, serves to supply power to a multivibrator 110. When powered by the power supply 100, the multivibrator 110 communicates enabling and disabling clock signals to a serial pattern generator, described below. These same clock signals are also communicated to a programmable digital oscilloscope 250, also described below.

As also shown in the upper left-hand corner of FIG. 3, and as mentioned above, the inventive system 10 also includes a serial pattern generator 120 having an internal clock 130. The serial pattern generator 120, which communicates with the PC 70 via the bus 80, serves to generate either uniform, evenly spaced, square wave digital electrical signals or pseudo-random digital electrical signals, such as the so-called (27)−1 pseudo-random pattern (see, e.g., the operation manual published by the Anritsu company of Tokyo, Japan, entitled "Error Rate Measuring Equipment, ME522A", pages 3–21 and 3–22 for a description of the (27)−1 pseudo-random pattern), or other user defined patterns, at transmission speeds of interest, e.g., 200 megabits per second (Mb/s). One such useful serial pattern generator is serial pattern generator model number ME522A sold by the Anritsu company of Tokyo, Japan. It should be noted that the internal clock 130 of the serial pattern generator 120 serves to generate evenly spaced, square wave clock pulses at a transmission speed which is identical to that of either the uniform square wave pattern or the pseudo-random pattern.

The serial pattern generator 120 is electrically connected to a microwave switch 140, such as microwave switch model number 34530A sold by the Hewlett-Packard company. This microwave switch is capable of directing the digital electrical signals generated by the serial pattern generator 120 to either of two output ports 142, 144. The choice of output port is controlled by a switch control unit 150, such as switch control unit model number 3488A sold by the Hewlett-Packard company. The switch control unit 150 is, in turn, controlled by the PC 70 via bus 80.

The output port 142 of the microwave switch 140 is electrically connected to a light-emitting, electro-optic transducer 160, such as a semiconductor laser or an LED, which communicates with the PC 70 via bus 80. If, for example, a semiconductor laser is employed, then one such useful semiconductor laser is semiconductor laser model number 8155A sold by the Hewlett-Packard company. This particular semiconductor laser is capable of emitting digital optical signals at a wavelength of 1300 nm and at a transmission speed of 200 Mb/s. Significantly, the extinction ratio (a term defined below) of this particular semiconductor laser is about 9.0, whereas the minimum extinction ratios of most of the semiconductor lasers employed in electro-optic modules is typically about 4.0. The significance of this fact is explained below.

The digital optical signals produced by the electro-optic transducer 160 in response to digital electrical signals generated by the serial pattern generator 120 are communicated via an optical fiber, e.g., a single mode optical fiber having a core diameter of 9.0 micrometers, to an optical attenuator 170, which communicates with the PC 70 via bus 80. One such useful optical attenuator is optical attenuator model number 8157A sold by the Hewlett-Packard company. The optical attenuator 170 in turn communicates attenuated digital optical signals, via another optical fiber, to an optical splitter 180, such as optical splitter model number ACS19C-1.3-9 sold by JDS Fitel,Inc. of Ottawa, Canada. The optical splitter 180 serves to split an incoming light signal into two signals, i.e., 90% of the incoming light is communicated via an optical fiber to the receiver 40 of the electro-optic module 20, while 10% of the incoming light is communicated via another optical fiber to an optical input port 202 of an optical switch 200. One such useful optical switch is optical switch model number CC-S-9-5-L-R-DO-R sold by JDS Fitel, Inc. The optical switch is also capable of receiving optical signals through an optical input port 204, as well as the optical input port 202, with the choice of input port being determined by control signals received from switch control unit 150. The optical output of optical switch 200 is in turn communicated via an optical fiber 205 to optical power meter 210. One such useful optical power meter is optical power meter model number 8152A sold by the Hewlett-Packard company.

As noted above, the optical splitter 180 serves to communicate 90% of the light received by the splitter to the receiver 40 of the module 20. The receiver 40, in turn, generates a corresponding differential output, which includes output O and corresponding, inverted output O-bar. This differential output is buffered by the emitter-coupled logic driver 55 and the inverted output of driver 55 is terminated into a 50 ohm load. The data output of the driver 55 is then communicated to a serial pattern comparator 220, which serves to compare the digital electrical signal produced by the receiver 40 to the corresponding digital electrical signal generated by the serial pattern generator 120. One such useful serial pattern comparator is serial pattern comparator model number ME522A RX sold by the Anritsu company. The serial pattern comparator 220 remains in sync with the serial pattern generator 120 because it receives clock signals from the internal clock 130 of the signal pattern generator 120 through a time delay unit 230. One such useful time delay unit includes a so-called mainframe unit, identified by model number 8080A, and so-called plug-in units, identified by model numbers 8092A and 8093A, sold by the Hewlett-Packard company. The time delay effected by this time delay unit is determined by pushing buttons on the front of this unit. To avoid the need for human intervention, switches on the time delay unit are electrically closed by an electro-mechanical relay unit 240, which receives control signals (denominated DIDO 2 and DIDO 3 in FIG. 3) from the PC 70 via the bus 90.

As shown in FIG. 3, the outputs O and O-bar, produced by the receiver 40, are both also communicated to a programmable digital oscilloscope 250 through 10× oscilloscope probes. This oscilloscope, which communicates with the PC 70 via bus 80, receives clock signals from the internal clock 130 of the serial pattern generator 120 via the time delay unit 230, as well as clock signals from the multivibrator 110. One such useful programmable digital oscilloscope is oscilloscope model CSA 404 sold by the Tektronix company of Beaverton, Ore.

As noted above, the microwave switch 140 is capable of switching the digital electrical signals generated by the serial pattern generator 120 to either output port 142 or output port 144. As shown in FIG. 3, the output port 144 is electrically connected, and thus serves to communicate the digital electrical signals generated by the serial pattern generator 120, to the emitter-coupled logic driver 50. The latter, in turn, serves to communicate received digital electrical signals to the transmitter ICs of the module 20 in differential form.

When the transmitter 30 receives a digital electrical signal, it produces a corresponding digital optical signal which is communicated, via an optical fiber 265, to an optical splitter 260 of the system 10, which is identical to the optical splitter 180. That is, the optical splitter 260 communicates 10% of an incident optical signal to input port 204 of optical switch 200 and 90% of the incident optical signal to an optical input port 251 of the oscilloscope 250.

In the operation of the inventive system 10, when, for example, tests are to be performed on the receiver 40 of module 20, then, under the control of the PC 70, the serial pattern generator 120 will generate a digital electrical signal which is communicated to the electro-optic transducer 160 via the microwave switch 140. The electro-optic transducer 160 will generate a corresponding digital optical signal, which is communicated to the optical splitter 180 via the optical attenuator 170. The optical splitter 180 will divert 10% of the incident digital optical signal to the optical switch 200 and then to the optical power meter 210. Simultaneously, the optical splitter 180 will divert 90% of the incident digital optical signal to the receiver 40 through optical fiber 45, which will then produce a corresponding digital electrical signal, which is communicated via the emitter-coupled logic driver 55 to the serial pattern comparator 220.

If tests are to be performed on the transmitter 30 of the electro-optic module 20, then, under the control of the PC 70, the serial pattern generator 120 will generate a digital electrical signal which is communicated to the emitter-coupled logic driver 50 via the microwave switch 140. The transmitter 30 will, in turn, produce a corresponding digital optical signal, which is communicated to the optical splitter 260. This splitter will divert 10% of the incident digital optical signal to the optical switch 200 and then to the optical power meter 210. This splitter will also divert 90% of the incident digital optical signal to port 251 of the programmable digital oscilloscope 250.

As noted, the inventive system 10 is controlled by the PC 70. In this regard, the invention also involves a computer program which is loaded into the PC 70, which computer program serves to effectuate the testing method associated with the invention. This computer program includes a number of subroutines, each of which is used in measuring a particular receiver parameter or a particular transmitter parameter. Each of these subroutines, which are individually useful, are described below with reference to the attached listings, labeled Subroutine A, Subroutine B, etc. These listings do not, however, contain lines of corresponding source code, which would have been very difficult for the reader to comprehend. Rather, these listings contain lines of comments which describe the corresponding source code, and thus these lines of comments serve as a kind of pseudo-code.

Attached Subroutine A is used to effectuate the method associated with the invention for measuring receiver sensitivity. Before describing this subroutine, it should be noted that the measurement method underlying this subroutine does not assume that the slope of Q versus P (expressed in milliwatts) is that predicted by theory, as is the case with previous such methods. This assumption is avoided because a variety of factors, such as mistakes in the processes used to manufacture the electro-optic modules, often lead to slopes which are different from the theoretically predicted slope. Therefore, the bit error rates (BERs) corresponding to three different values of optical power are measured. The three corresponding values of Q are then calculated using a version of Equation (2) in which the integral in Equation (2) is approximated by the first three terms of a power series representation of this integral, which assumes that Q is large. (In this regard, see equation 26.2.12 in the mathematical handbook edited by Abramowitz and Stegun and entitled "Handbook of Mathematical Functions".) That is, the three values of Q are calculated using the formula $$BER \cong \frac{1}{Q\sqrt{2\pi}} e^{-Q^2/2} \left(1 - \frac{1}{Q^2} + \frac{3}{Q^4}\right) \quad (3)$$

These three calculated values of Q, and the corresponding values of P, then represent three data points, to which is fitted a linear-least-squares-fit approximation. Thus, the slope of Q versus P is, in effect, determined empirically, rather than derived from theory. The value of Q corresponding to a desired BER is then calculated using Equation (3). The linear-least-squares-fit approximation is then extrapolated to this calculated value of Q, to determine the corresponding value of P.

Significantly, Subroutine A does not determine receiver sensitivity just at the center of the corresponding eye pattern. Rather, after the center of the eye pattern has been located, and assuming the width of the eye pattern is sufficiently large, receiver sensitivity is also measured at, for example, −0.7 nanoseconds (ns) and +0.7 ns from the center of the eye pattern. These displacements from the center of the eye pattern are chosen to conform to the time interval over which the deserializer integrated circuit device to be used in conjunction with the module under test is capable of sampling the electrical pulses produced by the receiver of the module.

With reference now to Subroutine A, step (1) is a command from the PC 70 to the power supply 60 to provide electrical power to the device under test (DUT) at an appropriate voltage, e.g., 5.0 volts.

Step (2) denotes a command from the PC 70 to switch control unit 150 to set microwave switch 140 so that the output of serial pattern generator 120 will be communicated to output port 142 and to set optical switch 200 so that the input to the optical switch 200 is via input port 202.

Step (3) is a command from PC 70 to serial pattern generator 120 to generate evenly spaced square waves at a transmission speed of interest, e.g., 200 Mb/s. As a consequence, the light-emitting electro-optic transducer 160 will generate corresponding, evenly spaced optical square waves which will be received by the receiver 40 of the module 20 under test.

Step (4) is a command from PC 70 to the programmable digital oscilloscope 250 to switch to the input channel carrying input from the receiver 40 of the module 20.

Step (5) is a command from PC 70 to the oscilloscope 250 specifying receiver channel range (in volts/division, e.g., 0.2 volts/division) and offset ( the voltage corresponding to the center graticule of the oscilloscope, e.g., 0.335 volts).

Step (6) is a command from the PC 70 to the oscilloscope 250 to trigger on the leading edge of an input waveform, i.e., to display the waveform in response to the leading edge of the waveform.

Step (7) is a command from the PC 70 to the oscilloscope 250 in which the oscilloscope time base, i.e., nanoseconds/division (e.g., 1.0 nanoseconds/division), and delay, i.e., the amount of time the oscilloscope should delay before initiating a waveform trace (e.g., 0.0 nanosecond delay), are defined.

Step (8) is a command from the PC 70 to the oscilloscope 250 to employ the average mode, which means that the oscilloscope is to display waveforms consisting of points, each of which is the average of a current point and of a corresponding previous point, so as to produce relatively smooth waveforms.

Step (9) is a command from the PC 70 to the oscilloscope 250 to determine the upper and lower voltages corresponding to the receiver waveform, in order to ensure that the electrical output of receiver 40 is switching in response to the square wave optical pulses produced by the light-emitting electro-optic transducer 160.

Step (10) is a command from the PC 70 to the oscilloscope 250 to receive clock pulses from the internal clock 130 of the serial pattern generator 120.

Step (11) is a command from the PC 70 to the serial pattern generator 120 to generate the (2\*\*7)−1 pseudo-random pattern.

Step (12) is a command from the PC 70 to the serial pattern comparator 220 to compare incoming signals to the (2\*\*7)−1 pseudo-random pattern.

Step (13) is a command from the PC 70 to the oscilloscope 250 to employ the normal mode, i.e., the persist mode, in which new waveforms are superimposed on old waveforms so as to produce an eye pattern.

Step (14) is a command from the PC 70 to the oscilloscope 250 to trigger in response to clock pulses from the internal clock 130 of the serial pattern generator 120.

Step (15) is a command from the PC 70 to the serial pattern comparator 220 in which the threshold voltage for the comparator is defined as 0.0 volts.

Step (16) is a command from the PC 70 to the optical power meter 210 to communicate received optical power in units of dB (instead of, for example, watts).

Step (17) is a command from the PC 70 to the optical power meter 210 defining a reference power level related to the difference between the optical powers communicated to the receiver 40 and the optical power meter 210, so that the optical power meter automatically communicates the power received by the receiver 40 to the PC 70. This reference power level is determined in accordance with the calibration procedure, described below.

Step (18) is a command from the PC 70 to the optical power meter 210 instructing the optical power meter to trigger, i.e., to take an optical power reading and communicate this reading to the PC 70, upon receiving a command from the PC 70.

Step (19) involves a series of commands from the PC 70 to several system components to determine the width of the eye pattern corresponding to the receiver 40 of the module 20, and to determine the receiver threshold power at the center of the eye pattern. That is, step (19a) is a command to the serial pattern comparator 220 to sample all incoming bits from the receiver 40 over a time period of, for example, 1.0 seconds. Step (19b) involves control signals to the electro-mechanical relay unit 240 to adjust the time delay unit 230 to produce a time delay, e.g., −3.8 nanoseconds, corresponding to the estimated (on the basis of previous experience) center of the eye pattern. Step (19c) is a command to the optical attenuator 170 to attenuate the optical power being coupled into the receiver 40 so that receiver threshold power is measured at an input optical power, e.g., −32 dB, at which the entire eye pattern is displayed on the oscilloscope screen. Step (19d) is a command from the PC 70 to the optical attenuator 170 to decrement power to the receiver 40 in steps of, for example, 0.2 dB, until the serial pattern comparator 220 detects errors in the center of the eye pattern. At that point, the optical attenuator is to increase optical power to the receiver by 0.3 dB, so that all errors in the center of the eye pattern are eliminated, with the resulting power constituting receiver threshold power at the center of the eye pattern. This is significant in that the center of the eye is a function of the received optical power. Therefore the center of the eye is measured at the receiver threshold power which is sufficiently close to the BER measurement points described below. Step (19e) involves a series of commands for obtaining the width of the eye pattern. That is, step (19e-1) is a command from the PC 70 to the serial pattern comparator 220 to sample all incoming bits from the receiver 40 over a time period of, for example, 1.0 seconds. Step (19e-2) is a command from the PC 70 to the electro-mechanical relay unit 240 to adjust the time delay unit 230 to produce a time delay approximately corresponding to the right-hand edge of the eye pattern. The width of an eye pattern is typically 1.4 ns, and therefore this right-hand edge is about 0.7 ns from the center of the eye pattern. Step (19e-3) is a command from the PC 70 to the electro-mechanical relay unit 240 to adjust the time delay unit 230 to increment or decrement the time delay in steps of, for example, 0.1 ns, until the right-hand edge of the eye pattern is found, i.e., until the serial pattern comparator first detects errors. Steps (19e-4) and (19e-5) serve to determine the left-hand edge of the eye pattern. In step (19e-6), the delay times corresponding to the right-hand and left-hand edges of the eye pattern are saved. Step (19f) is self-explanatory.

Step (20) is a command from the PC 70 to the electro-mechanical relay unit 240 to adjust the time delay unit 230 to achieve a time delay of −0.7 ns from the center of the eye pattern.

Step (21) involves a series of commands for obtaining a power level at which the serial pattern comparator 220 measures a BER between $10^{}-7$ and $10^{}-8$. That is, step (21a) is a command from the PC 70 to the serial pattern comparator 220 to sample all bits from the receiver 40 over a time period of, for example, 1.0 seconds. Step (21b) is a command from the PC 70 to the optical attenuator 170 to increment or decrement optical power to the receiver 40 until the serial pattern comparator 220 measures a BER less than, for example, $10^{}-2$. In step (21c), the BER is checked to see if it is between $10^{}-7$ and $10^{}-8$. If not, and if, for example, the first BER is greater than $5 \times 10^{}-4$, then in step (21d) the optical power to the receiver 40 is increased by, for example, 0.4 dB. In step (21e), the BER is checked again to see if it is between $10^{}-7$ and $10^{}-8$. If not, then in step (21f) the values of Q corresponding to the first two measured values of BER are calculated using Equation (3). These calculations involve guessing values of Q, and subtracting the right-hand side from the left-hand side of Equation (3) until this difference is zero, or essentially zero. A straight line is then fitted to the two calculated values of Q in relation to the corresponding values of P. Equation (3) is thereafter used to calculate the value of Q corresponding to a BER of, for example, $10^{}-8$. The above-mentioned straight line relation between Q and P is extrapolated to determine the value of P corresponding to the last calculated value of Q. This last value of P then constitutes the receiver sensitivity at a BER of $10^{}-8$. Step (21g) involves fine adjustments to the above procedure, if needed.

In step (22), the power level corresponding to a BER of $10^{**}-8$, as determined in step (21), is twice decremented by 0.4 dB, to obtain a total of three power levels, to be used in succeeding steps.

In step (23), the three power levels determined in step (22) are saved.

Step (24) is a command from the PC 70 to the serial pattern comparator 220 to sample all bits from the receiver 40 over a time period of 2.0 seconds.

In step (25), the BERs corresponding to the three power levels of step (22) are measured.

In step (26), the values of Q corresponding to the three measured values of BER are calculated using Equation (3). These three values of Q and the three corresponding values of P define three data points, to which is fitted a linear-least-squares-fit approximation. Equation (3) is now used to calculate the value of Q corresponding to the desired value of BER, e.g., $10^{**}-15$. The linear-least-squares-fit approximation is now extrapolated to this value of Q, to determine the corresponding value of P.

A significant aspect of the invention, which is incorporated into step (27), is the recognition that receiver sensitivity is a function of the extinction ratio associated with the electro-optic transducer 160 used to measure receiver sensitivity. Yet another significant aspect of the invention is the finding that by adding a correction factor (CR) to a receiver sensitivity measurement made using a first extinction ratio, that the value of receiver sensitivity corresponding to a second extinction ratio is readily determined. Moreover, it has been determined that the above CR is given by $$CR = 10 * \log((LSER2+1)/(LSER2-1)) - 10 * \log((LSER1+1)/(LSER1-1))$$

where LSER1 is the extinction ratio used in measuring receiver sensitivity, while LSER2 is the extinction ratio for which receiver sensitivity is desired. In this regard, if, for example, the electro-optic transducer 160 is a semiconductor laser exhibiting an extinction ratio of 9.0, rather than 4.0, as is conventional, then in step (27) a CR is added to the receiver sensitivity measured in step (26), where the CR is given by $$CR=10*\log((4+1)/(4-1))-10*\log((9+1)/(9-1)).$$

It must be noted that CR is in units of dB, and is added to the value of measured receiver sensitivity, also expressed in dB. It should also be noted that the value of extinction ratio used in measuring receiver sensitivity is itself measured using the corresponding calibration procedure, described below.

In step (28), the correlation between the three data points of step (26) and the linear-least-squares-fit approximation is calculated. If, for example, all three data points fall on the linear-least-squares-fit approximation, then the correlation will be 1.0. Preferably, the correlation should be at least 0.98. In addition, the slope of the linear-least-squares-fit approximation is determined.

In step (29), the receiver sensitivity determined above is compared against a corresponding specification.

Steps (30)–(38) are identical to steps (20)–(29), only the delay time corresponds to +0.7 ns.

Attached subroutine B is used to effectuate the method associated with the invention for measuring receiver pulse width distortion (RPWD). This receiver parameter is defined as $$RPWD=((Tp-Tn)/(Tp+Tn))\times 100, \quad (5)$$

where Tp denotes the width of a positive pulse produced by the receiver 40 and Tn denotes the width of a negative pulse produced by the receiver 40, and where the width of each pulse is measured at a voltage level exactly half-way between the top and bottom of the pulse while the receiver is being optically driven by uniform, evenly spaced, square wave optical pulses at a transmission speed of interest.

With reference to subroutine B, steps (1) and (2) are self-explanatory.

Step (3) is a command from the PC 70 to the serial pattern generator 120 to generate uniform, evenly spaced square waves at a transmission speed of interest, e.g., 200 Mb/s. As a consequence, the light-emitting electro-optic transducer 160 will generate corresponding, uniform, evenly spaced square waves which will be received by the receiver 40 of the module 20 under test.

Step (4) is self-explanatory.

Step (5) is a command from PC 70 to the oscilloscope 250 specifying receiver channel range, e.g., 0.2 volts/division, and offset, e.g., 0.335 volts is specified as the voltage corresponding to the center graticule of the oscilloscope.

Step (6) is self-explanatory.

Step (7) is a command from the PC 70 to the oscilloscope 250 specifying time base, e.g., 2.0 ns/division, and delay, e.g., 0.0 ns.

Steps (8), (9) and (10) are self-explanatory.

Step (11) is a command from the PC 70 to the optical attenuator 170 to attenuate the optical power being coupled into the receiver 40 so as to perform the test at a desired optical power, e.g., −23 dB.

Steps (12) and (13) are self-explanatory.

Step (14) is a command from the PC 70 to the oscilloscope 250 ordering the oscilloscope to check that the voltage difference between the top and bottom of the waveform is sufficient, e.g., at least 0.08 volts.

In step (15), Tp and Tn are measured. That is, steps (15a)–(15e) involve an examination of adjacent receiver pulses to distinguish between a positive pulse (i.e., a pulse having an upwardly inclined leading edge) and a negative pulse (i.e., a pulse having a downwardly inclined leading edge). Based upon these distinctions, the width of a postive pulse is measured to obtain Tp and the width of a negative pulse is measured to obtain Tn.

In step (16), RPWD is calculated, using Equation (5).

Attached subroutine C is used to effectuate the method associated with the invention for measuring receiver signal detect threshold (RSDT). That is, steps (1)–(6) are self-explanatory. Step (7) is a command from the PC 70 to the optical attenuator 170 to decrement optical power to the receiver 40 in increments of, e.g., 0.2 dB, until the RSDT voltage signal (DIDO 4) is detected. The corresponding value of optical power coupled into the receiver 40 constitutes RSDT. In step (9), CR is added to RSDT and in step (10), a pass/fail determination is made.

Figure 1:
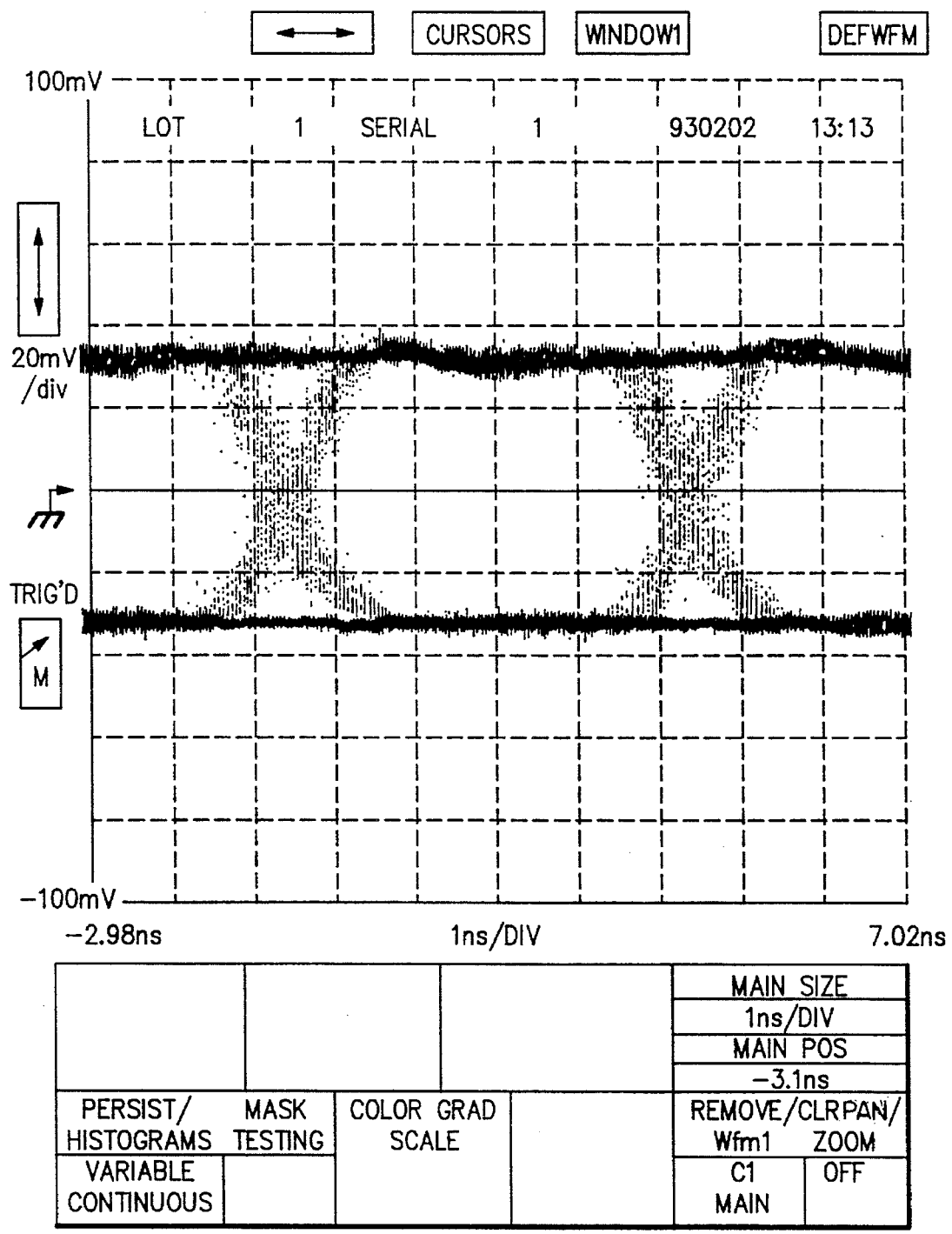
FIG. 1 is a photograph of an oscilloscope screen showing an eye pattern associated with the receiver of an electro-optic module.
Figure 2:
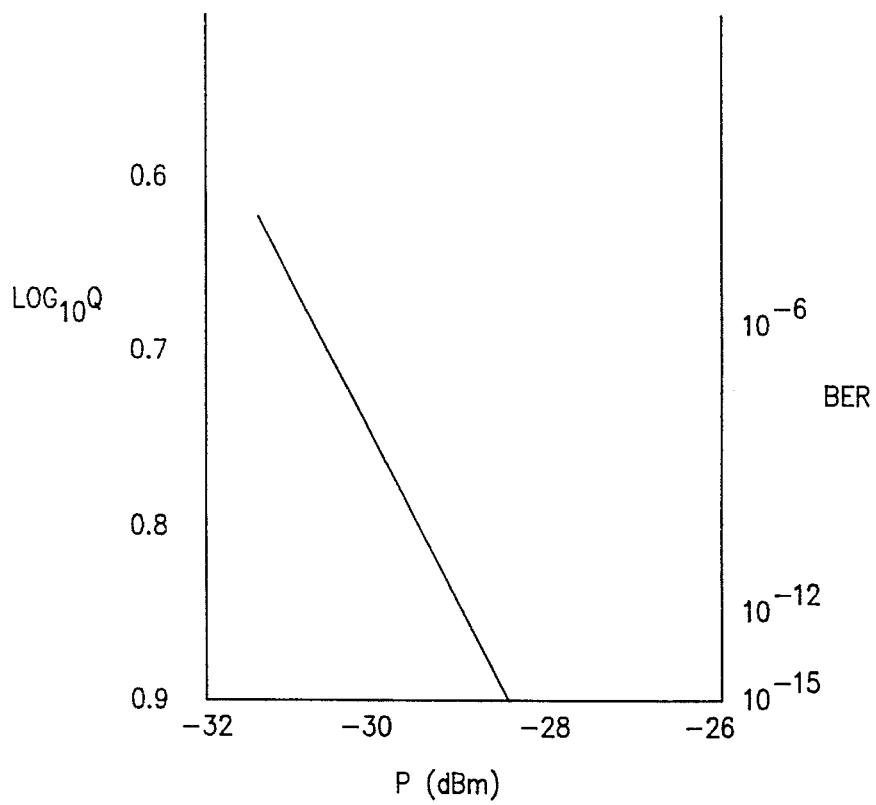
FIG. 2 is a plot of log Q (on the left-hand vertical scale) and of BER (on the right-hand vertical scale) versus P (in dB), where the slope of this plot is based upon theory.
Figure 4:
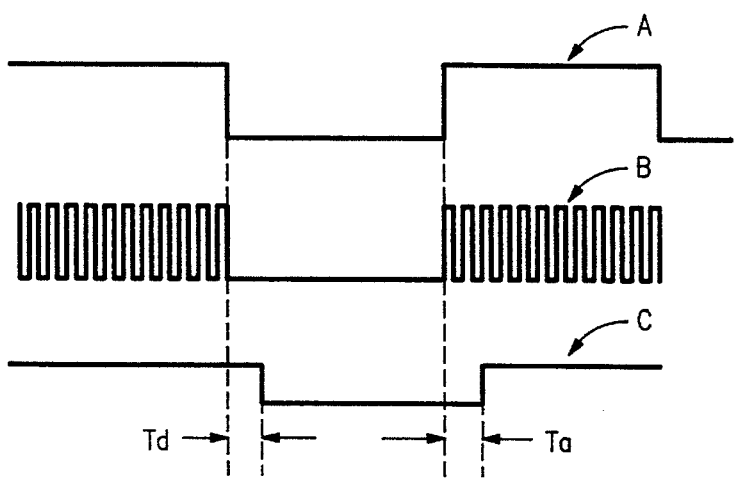
FIG. 4 is a sketch of certain signal waveforms which serves to define receiver signal detect assert and deassert times.

Attached subroutine D is used to effectuate the method associated with the invention for measuring receiver signal detect assert time (Ta) and receiver signal detect deassert time (Td). That is, in accordance with this method, the signal pattern generator 120 is used to generate the (2**7)−1 pseudo-random pattern at a transmission speed of interest, e.g., 200 Mb/s. This pseudo-random pattern is communicated to the electro-optic transducer 160, which generates a corresponding pseudo-random optical pattern communicated to the receiver 40. While the pseudo-random generator 120 is operating, the power supply 100 is used to supply power to the multivibrator 110, which sends enabling and disabling clock signals to the serial pattern generator 120 at a frequency of, for example, 200 Hertz. These clock signals are depicted in FIG. 4, as is the pseudo-random pattern, with the former being denoted by the letter A and the latter being denoted by the letter B in FIG. 4. As shown, when the multivibrator 110 generates a positive pulse (which is necessarily much longer than any of the individual pulses generated by the signal pattern generator 120), the signal pattern generator 120 is enabled. Similarly, when the multivibrator 110 generates a negative pulse, the signal pattern generator is disabled.

In addition to depicting the enabling and disabling clock signals generated by the multivibrator 110 and the pseudo-random pattern generated by the signal pattern generator 120, FIG. 4 also depicts the voltage signal produced by the module pin dedicated to generating the RSDT voltage, which signal is denoted by the letter C. As shown in FIG. 4, when the signal pattern generator 120 is disabled by a disabling clock pulse from the multivibrator 110, there is a time lag in the corresponding response in the RSDT voltage signal, which is defined as Td. Similarly, as shown in FIG. 4, when the signal pattern generator 120 is enabled by an enabling clock pulse from the multivibrator 110, there is also a time lag in the corresponding response in the RSDT voltage signal, which is defined as Ta.

With reference to subroutine D, step (1) is self-explanatory.

Step (2) is self-explanatory, except that "Gate sync" means that the clock pulses generated by the multivibrator are to trigger the oscilloscope 250.

Step (3) is a command from the PC 70 turning on the power supply 100, and thereby providing power to the multivibrator 110.

In step (4), "Gate" refers to the multivibrator 110, and the corresponding "Gate" input channel 252 range is, for example, 0.05 volts/division, and the corresponding offset is, for example, 0.0 volts.

In step (5), the channel range and offset are specified for step (13), the difference between the upper and lower "Gate"

input channel 252, of the oscilloscope 250 on which the RSDT voltage signal is to be communicated. This channel range is, for example, 0.2 volts/division, and the corresponding offset is, for example, 3.45 volts.

In step (6), the oscilloscope 250 is commanded to trigger in response to the "Gate" waveform.

In step (7), the time base and delay for the oscilloscope 250 are specified. These are, for example, 100 microseconds/division and −500 microseconds, respectively, which permits both the "Gate" waveform and the RSDT waveform to be displayed simultaneously.

Steps (8)–(10) are self-explanatory.

In step (11), the optical power to be coupled into the receiver 40 during the test, e.g., −27 dB, is specified.

Step (12) is self-explanatory.

In step (13), the difference between the upper and lower "Gate" waveform voltages is determined by the oscilloscope 250 to make certain this difference is greater than, for example, 0.04 volts.

In step (14), the difference between the upper and lower RSDT waveform voltages is determined by the oscilloscope 250 to make certain this difference is greater than, for example, 0.15 volts.

In step (15), the positive (upwardly inclined) leading edges of the "Gate" and RSDT waveforms are identified.

In step (16), the results obtained in step (16) are converted to microseconds and saved.

In step (17), Ta is calculated and checked to see if it conforms to a corresponding specification.

In step (18), the negative (downwardly inclined) leading edges of the "Gate" and RSDT waveforms are identified.

In step (19), the results obtained in step (18) are converted to microseconds and saved.

In step (20), Td is calculated and checked to see if it conforms to a corresponding specification.

Attached subroutine E is used to effectuate the method associated with the invention for measuring transmitter average power. In this regard, it should be understood that when the transmitter 30 of the module 20 is producing a digital optical signal, that the transmitter is switching between a relatively high optical output power and a relatively low optical output power, and that transmitter average power denotes the average of these two optical powers.

With reference to subroutine E, step (1) is self-explanatory.

Step (2) denotes a command from the PC 70 to switch control unit 150 to set microwave switch 140 so that the output of serial pattern generator 120 will be communicated to output port 144 and to set optical switch 200 so that the input to the optical switch is via input port 204.

Step (3) is a command from PC 70 to serial pattern generator 120 to generate the (27)−1 pseudo-random pattern. As a consequence, the transmitter 30 of the module 20 will produce a corresponding, pseudo-random optical pattern, which will be communicated via the optical switch 200 to the optical power meter 210**.

Step (4) is self-explanatory.

Step (5) is a command from the PC 70 to the optical power meter 210 defining a reference average power level related to the difference between the average optical power generated by the transmitter 30 and the average optical power communicated to the optical power meter 210, so that the optical power meter communicates the average optical power generated by the transmitter 30 to the PC 70.

Step (6) is a command from the PC 70 to the optical power meter 210 to trigger continuously, i.e., to constantly monitor average optical power.

Step (7) is a command from the PC 70 to the optical power meter 210 requesting the most recent value of average optical power generated by the transmitter 30.

Step (8) is a check on whether the transmitter is effectively dead. That is, if the most recent value of average optical power is, for example, less than −50 dB, then it is assumed that the transmitter is effectively dead.

Step (9) involves a comparison between the most recently measured value of average optical power and corresponding specification.

Attached subroutine F is used to effectuate the method associated with the invention for measuring transmitter rise and fall times. In this regard, it should be understood that transmitter rise time denotes the amount of time required by the upwardly inclined portion of a transmitter optical pulse to rise from 20% to 80% of the pulse topline, relative to the pulse baseline, when the transmitter is driven by uniform, evenly spaced, square wave electrical pulses at a transmission speed of interest. Similarly, it should be understood that transmitter fall time denotes the amount of time required by the downwardly inclined portion of a transmitter optical pulse to fall from 80% to 20% of the pulse topline, relative to the pulse baseline, when the transmitter is driven as described above.

With reference to subroutine F, steps (1)–(3) are self-explanatory.

In step (4), it should be noted that the transmitter channel range and offset are automatically chosen by the oscilloscope 250 so that the transmitter waveform fits on the screen. Still, it should also be noted that the transmitter channel range is typically chosen to be 0.0001 volts/division and the offset is 0.0 volts. Moreover, as noted in step (4), the coupling is AC, and therefore the waveform swings around 0.0 volts.

Step (5) is self-explanatory.

In step (6), the time base is, e.g., 2.0 ns/division, and the delay is, e.g., 0.0 ns.

Steps (7) and (8) are self-explanatory.

In step (9), a sufficient amplitude is, for example, 0.00001 volts.

Steps (10)–(14) are self-explanatory.

Attached subroutine G is used to effectuate the method associated with the invention for measuring transmitter extinction ratio. In this regard, as noted above, when the transmitter 30 produces optical pulses, it switches between a relatively high optical power level and a relatively low optical power level. In addition, it should be understood that transmitter extinction ratio denotes the ratio of these power levels when the transmitter is electrically driven by uniform, evenly spaced, square wave pulses transmitted at a transmission speed of interest.

With reference to subroutine G, steps (1) and (2) are self-explanatory.

In step (3), the transmission speed of the square wave pattern is, for example, 40 Mb/s.

In step (4), the transmitter channel range and offset are automatically chosen by the oscilloscope 250 so that the transmitter waveform fits on the screen. In addition, the coupling is DC.

Step (5) is self-explanatory.

In step (6), the time base is, for example, 10 ns/division and the delay is, for example, 0.0 ns.

Steps (7) and (8) are self-explanatory.

In step (9), a sufficient amplitude is, for example, 0.00001 volts.

Steps (10)–(12) are self-explanatory.

Attached subroutine H is used to effectuate the method associated with the invention for measuring transmitter duty cycle distortion (TDCD). This transmitter parameter is defined as $$TDCD = (Tp' - Tn')/2, \quad (6)$$

where Tp' denotes the width of a positive pulse produced by the transmitter 30, Tn' denotes the width of a negative pulse produced by the transmitter 30, and where the width of each pulse is measured at a voltage level exactly half-way between the top and bottom of the pulse while the transmitter is being electrically driven by uniform, evenly spaced, square wave pulses at a transmission speed of interest.

With reference to subroutine H, steps (1) and (2) are self-explanatory.

In step (3), the transmission speed is, for example, 200 Mb/s.

In step (4), the transmitter channel range and offset are automatically chosen by the oscilloscope so that the transmitter waveform fits on the screen. The coupling is AC.

Step (5) is self-explanatory.

In step (6), the time base is, for example, 2 ns/division and the delay is, for example, 0.0 ns.

Steps (7) and (8) are self-explanatory.

In step (9), a sufficient amplitude is, for example, 0.00001 volts.

In step (10), the reference voltage for the oscilloscope is set to 0.0 volts.

Steps (11) and (12) are self-explanatory.

Figure 5:
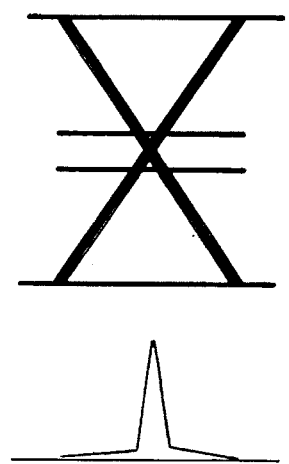
FIG. 5 is a sketch of one end of an eye pattern associated with the transmitter of an electro-optic module, depicting the method associated with the invention for measuring transmitter data dependent jitter.

Attached subroutine I is used to effectuate the method associated with the invention for measuring the root mean square transmitter data dependent jitter (TDDJ). In this regard, and as depicted in FIG. 5, it should be understood that this transmitter parameter involves the formation of an eye pattern associated with the transmitter, when the transmitter is electrically driven by a digital pattern called the K28.5 pattern. (Regarding the K28.5 pattern see, e.g., A. X. Widmer et al, "A DC-Balance, Partitioned-Block, 8B/10B Transmission Code", IBM Journal of Research and Development, Vol. 27, No. 5, September 1983.) In addition, as also depicted in FIG. 5, this parameter further involves the formation of a box around the center of the X-like voltage crossings at one end of the transmitter eye pattern, and the formation of a histogram related to the number of voltage crossings across the center of the X. TDDJ is just the standard deviation associated with this histogram.

With reference to subroutine I, steps (1) and (2) are self-explanatory.

In step (3), the transmission speed of the square wave pattern is, for example, 200 Mb/s.

In step (4), the time base is, for example, 2 ns/division and the delay is, for example, 0.0 ns.

In step (5), it should be noted that the channel range and offset are automatically chosen by the oscilloscope 250 so that the transmitter waveform fits on the screen. Also, the coupling is AC.

Steps (6)–(8) are self-explanatory.

In step (9), a sufficient amplitude is, for example, 0.00001 volts.

Step (10) is a command from the PC 70 to the serial pattern generator to generate the K28.5 pattern.

Step (11) is a command from the PC 70 to the oscilloscope 250 to switch to normal acquisition, i.e., the persist mode, so as to generate an eye pattern.

Step (12) is a command from the PC 70 to the oscilloscope 250 to trigger off the clock pulses generated by the internal clock 130 of the serial pattern generator 120, and specifically to trigger off the negative clock pulse transitions.

Step (13) involves the formation of a box on the oscilloscope screen around the center of the X-like voltage crossings at one end of the eye pattern on the screen. That is, in step (13a), colors are assigned to each pixel indicative of the number of times a pixel has been illuminated. In step (13b), the vertical voltage scale is set to absolute values of voltage, rather than relative voltage values. In step (13c), the left and right sides of the box are defined, with the horizontal time scale on the screen extending from 0% to 100%, thereby encompassing the entire screen display. In step (13d), the top and bottom of the transmitter waveform is measured, and the distal parameter is set at 68% of the height of the waveform, the proximal parameter is set at 15% of the height of the waveform, and the mesial parameter is set at 50% of the height of the waveform. In step (13e), the oscilloscope loops, i.e., counts the number of points in the box, until, for example, at least 50 points are found. In step (13f), the oscilloscope performs the TDDJ measurement, using its internal program, i.e., the oscilloscope measures the standard deviation associated with above-mentioned histogram. In step (13f), the result of the TDDJ measurement in step (13e) is converted to picoseconds.

Step (14) is self-explanatory.

A significant advantage associated with the inventive system 10 is the fact that the optical fibers associated with the system are never physically moved during testing of modules. As a consequence, the inventive system 10 only needs to be calibrated about once a day. This fact should be contrasted with previous manual systems, where the optical fibers are repeatedly moved, necessitating system calibrations beteen each test. This difference is one of the reasons why electro-optic modules are tested so much more quickly using the inventive system 10.

To complete the present disclosure, the calibration procedures used in connection with the inventive system 10 are described below, with reference to corresponding calibration subroutines.

With reference to Subroutine J, which relates to the optical power meter calibration procedure, step (1) is a command from the PC 70 to the optical power meter 210 to set the optical power meter calibration value and optical power meter reference value to 0.0 dB in preparation for the calibration procedure.

Step (2) denotes a command from the PC 70 to the optical power meter 210 to set the calibration factor to the value of the optical head lens loss, e.g., −0.09 dB.

Step (3) is a command from the PC 70 to the optical power meter 210 to set the wavelength at which the calibration measurement is to be made, e.g., 1309 nanometers.

Step (4) displays a message on the PC 70 display requesting that the operator type in the optical power, e.g., −5.0 dB, at the output of a 3 meter optical fiber, known hereafter as the floor optical fiber, connected to a stable laser source, known hereafter as the floor laser source. The optical power measurement is made using a precision power meter, to be known hereafter as the floor power meter.

Step (5) displays a message on the PC 70 display requesting the operator to connect the optical fiber of the floor laser to the optical power meter 210. The PC 70 then commands the optical power meter 210 to communicate the current optical power meter reading to the PC 70.

Step (6) calculates the difference in optical power between the floor laser source optical power and the optical power meter 210 reading obtained in step (5) and adds to this difference, the optical head lens loss.

Step (7) is a command from the PC 70 to the optical power meter 210 to store the value calculated in step 6 as a calibration value.

Step (8) is a command from the PC 70 to the optical power meter 210 to communicate the current optical power to the PC 70.

Step (9) calculates the difference between the floor laser power and the power received from the optical power meter 210. The difference is then compared to a corresponding specification to determine if the value should be saved.

With reference to Subroutine K, which relates to the transmitter fixture calibration procedure, step (1) is a command from the PC 70 to the optical power meter 210 to set the optical power meter calibration value and optical power meter reference value to 0.0 dB in preparation for the calibration procedure.

Step (2) denotes a command from the PC 70 to the optical power meter 210 instructing the optical power meter to continuously update its display and to return the current display value when requested by the PC 70.

Step (3) is a command from the PC 70 to the optical power meter 210 to set the reference power level to 0.0 dB.

Step (4) is a command from the PC 70 to the optical power meter 210 to set the wavelength at which the calibration measurement is to be made, e.g., 1309 nanometers.

Step (5) displays a message on the PC 70 display requesting that the operator connect the floor optical fiber to the FC end of a calibration fiber, e.g., a duplex fiber with FC connectors on one end and a duplex receptacle on the other end, the duplex receptacle of the calibration fiber to the duplex connector of the system, and to connect the transmitter fiber 265 to the optical power meter 210. The PC 70 then commands the optical power meter 210 to communicate the current optical power meter reading to the PC 70.

Step (6) calculates the difference in optical power between the floor laser source optical power and the optical power meter 210 reading. This is known as the transmitter fiber/fixture loss.

Step (7) compares the result of the calculation with the corresponding specification to determine if the value should be saved and displays the result.

With reference to Subroutine L, which relates to the transmitter link calibration procedure, step (1) is a command from the PC 70 to the switch control unit 150 to set the optical switch 200 so that the input to optical switch 200 is via input port 204.

Step (2) is a command from the PC 70 to the optical power meter 210 to set the optical power meter calibration value and optical power meter reference value to 0.0 dB in preparation for the calibration procedure.

Step (3) denotes a command from the PC 70 to the optical power meter 210 instructing the optical power meter to continuously update its display and to return the current display value when requested by the PC 70.

Step (4) is a command from the PC 70 to the optical power meter 210 to set the reference power level to 0.0 dB.

Step (5) is a command from the PC 70 to the optical power meter 210 to set the wavelength at which the calibration measurement is to be made, e.g., 1309 nanometers.

Step (6) displays a message on the PC 70 display requesting that the operator connect the transmitter fiber 265 back to the optical splitter 260, and the optical power meter fiber 205 back to the optical power meter 210. The PC 70 then commands the optical power meter 210 to communicate the current optical power meter reading to the PC 70.

Step (7) calculates the difference in optical power between the floor laser source minus the fiber/fixture loss, and the optical power obtained in step 6. This is known as the transmitter link loss.

Step (8) is a command from the PC 70 to the optical power meter 210 to set the reference to the value obtained in step 7.

Step (9) is a command from the PC 70 to the optical power meter 210 to communicate the current optical power reading to the PC 70.

Step (10) compares the result of the calculation with the corresponding specification to determine if the value should be saved and displays the result.

With reference to Subroutine M, which relates to the receiver link calibration procedure, step (1) denotes a command from the PC 70 to switch control unit 150 to set microwave switch 140 so that the output of serial pattern generator 120 will be communicated to output port 142 and to set optical switch 200 so that the input to the optical switch 200 is via input port 202.

Step (2) is a command from the PC 70 to the optical power meter 210 to set the optical power meter calibration value and optical power meter reference value to 0.0 dB in preparation for the calibration procedure.

Step (3) denotes a command from the PC 70 to the optical power meter 210 instructing the optical power meter to continuously update its display and to return the current display value when requested by the PC 70.

Step (4) is a command from the PC 70 to the optical power meter 210 to set the reference power level to 0.0 dB.

Step (5) is a command from the PC 70 to the optical power meter 210 to set the wavelength at which the calibration measurement is to be made, e.g., 1300 nanometers.

Step (6) is a command from the PC 70 to the optical attenuator 170 to set the attenuation to 0.0 dB.

Step (7) displays a message on the PC 70 display requesting that the operator connect the receiver side of the duplex connector 45 to the optical power meter 210. The PC 70 then commands the optical power meter 210 to communicate the current optical power meter reading to the PC 70.

Step (8) displays a message on the PC 70 display requesting that the operator connect the optical power meter fiber 205 to the optical power meter 210. The PC 70 then commands the optical power meter 210 to communicate the current optical power meter reading to the PC 70.

Step (9) calculates the difference in optical power between the readings obtained in steps 7 and 8. This is known as the receiver link loss.

Step (10) is a command from the PC 70 to the optical power meter 210 to set the reference to the value obtained in step 9.

Step (11) is a command from the PC 70 to the optical power meter 210 to communicate the current optical power reading to the PC 70.

Step (12) compares the result of the calculation with the corresponding specification to determine if the value should be saved and displays the result.

With reference to Subroutine N, which relates to the frequency generator calibration procedure, step (1) determines the limits to which the results will be compared, e.g., desired frequency of 100 MHz +/−1%, desired voltage amplitude of 1.0 volts +/−10%, desired voltage offset of 0.0 volts +/−10%.

Step (2) denotes a command from the PC 70 to the switch control unit 150 to set microwave switch 140 so that the output of serial pattern generator 120 will be communicated to output port 144 and to set optical switch 200 so that the input to the optical switch 200 is via input port 204.

Step (3) is a command from the PC 70 to the oscilloscope 250 to employ the normal mode, i.e., the persist mode, in which new waveforms are superimposed on old waveforms so as to produce an eye pattern.

Step (4) is a command from PC 70 to the oscilloscope 250 specifying receiver channel range (in volts/division, e.g., 0.2 volts/division) and offset (the voltage corresponding to the center graticule of the oscilloscope, e.g., 0.0 volts).

Step (5) is a command from the PC 70 to the oscilloscope 250 to trigger on the leading edge of an input waveform, i.e., to display the waveform in response to the leading edge of the waveform.

Step (6) is a command from the PC 70 to the oscilloscope 250 in which the oscilloscope time base, i.e., nanoseconds/division (e.g., 3.0 nanoseconds/division), and delay, i.e., the amount of time the oscilloscope should delay before initiating a waveform trace (e.g., 0.0 nanosecond delay), are defined.

Step (7) is a command from the PC 70 to the oscilloscope 250 to employ the average mode, which means that the oscilloscope is to display waveforms consisting of points, each of which is the average of a current point and of a corresponding previous point, so as to smooth the waveforms.

Step (8) displays a message on the PC 70 display requesting that the operator connect the output of the frequency generator 150 to a channel of the oscilloscope.

Step (9) consists of several commands from the PC 70 to the oscilloscope 250 requesting the frequency of the waveform (step 9a), the voltage amplitude of the waveform (step 9b), and the voltage offset of the waveform (9c). At this point the operator must adjust the frequency generator until all parameters are within the specifications calculated in step 1. When the parameters are satisfactorily adjusted, the keyboard termination key is pressed by the operator (step 9d), e.g., enter key, and the values are saved.

With reference to Subroutine 0, which relates to the oscilloscope calibration procedure, step (1) displays a message on the PC 70 display requesting that the operator remove the optical fiber from the channel 251 input and cover the input with a protective cap. A command is then sent from the PC 70 to the oscilloscope 250 to calibrate the channel 251.

Step (2) displays a message on the PC 70 display requesting that the operator remove the cable from channel 256 of the oscilloscope and connect a spare cable from channel 256 to the oscilloscope calibrator output. A command is then sent from the PC 70 to the oscilloscope 250 to calibrate the 256 channel.

Step (3) calibrates channel 255 using the method in step 2.

Step (4) calibrates channel 253 using the method in step 2.

Step (5) calibrates channel 254 using the method in step 2.

Step (6) displays the results of the calibration.

With reference to Subroutine P, which relates to the laser source extinction ratio calibration procedure, step (1) denotes a command from the PC 70 to the switch control unit 150 to set optical switch 200 so that the input to the optical switch 200 is via input port 204.

Step (2) is a command from the PC 70 to the switch control unit 150 to set microwave switch 140 so that the output of the serial pattern generator 120 will be communicated to output port 142.

Step (3) is a command from PC 70 to the serial pattern generator 120 to generate evenly spaced square waves at a transmission speed of interest, e.g., 200 Mb/s. As a consequence, the light-emitting electro-optic transducer 160 will generate corresponding, evenly spaced optical square waves.

Step (4) is a command from the PC 70 to the oscilloscope 250 to employ the normal mode, i.e., the persist mode, in which new waveforms are superimposed on old waveforms so as to produce an eye pattern.

Step (5) is a command from PC 70 to the oscilloscope 250 specifying receiver channel range (in volts/division, e.g., 0.00005 volts/division) and offset (the voltage corresponding to the center graticule of the oscilloscope, e.g., 0.00015 volts).

Step (6) is a command from the PC 70 to the oscilloscope 250 to trigger on the leading edge of an input waveform, i.e., to display the waveform in response to the leading edge of the waveform.

Step (7) is a command from the PC 70 to the oscilloscope 250 in which the oscilloscope time base, i.e., nanoseconds/division (e.g., 5.0 nanoseconds/division), and delay, i.e., the amount of time the oscilloscope should delay before initiating a waveform trace (e.g., −5.0 nanosecond delay), are defined.

Step (8) is a command from the PC 70 to the optical power meter 210 to communicate received optical power in units of dB (instead of, for example, watts).

Step (9) is a command from the PC 70 to the optical power meter 210 defining a reference power level related to the difference between the optical powers communicated to the receiver 40 and the optical power meter 210, so that the optical power meter automatically communicates the power received by the receiver 40 to the PC 70.

Step (10) is a command from the PC 70 to the optical power meter 210 instructing the optical power meter to trigger, i.e., to take an optical power reading and communicate this reading to the PC 70, upon receiving a command from the PC 70.

Step (11) is a command from the PC 70 to the electro-optic transducer 160 to disable its output in order to perform the following step.

Step (12) displays a message on the PC 70 display requesting that the operator connect the output of the electro-optic transducer 160 to the transmitter optical splitter 260 input.

Step (13) is a command from the PC 70 to the electro-optic transducer 160 to enable its output.

Step (14) is a command from the PC 70 to the oscilloscope 250 to employ the average mode, which means that the oscilloscope is to display waveforms consisting of points, each of which is the average of a current point and of a corresponding previous point, so as to smooth the waveforms.

Step (15) is a command from the PC 70 to the oscilloscope 250 to determine the upper and lower voltages of the electro-optic transducer 160.

Step (16) determines the amplitude of the waveform and compares it to the corresponding specification, e.g., greater than 0.00001 volts.

Step (17) calculates the extinction ratio of the electro-optic transducer using the equation:

$$ER = (TOP\ LEVEL\ VOLTAGE)/(BOTTOM\ LEVEL\ VOLTAGE)$$

Step (18) compares the result of the calculation with the corresponding specification to determine if the value should be saved, and displays the result.

With reference to Subroutine Q, which relates to the data dependent jitter calibration procedure, step (1) denotes that this portion of the procedure relates to oscilloscope channel 256 and is the first of two parts.

Step (2) denotes a command from the PC 70 to the switch control unit 150 to set microwave switch 140 so that the output of serial pattern generator 120 will be communicated to output port 144 and to set optical switch 200 so that the input to the optical switch 200 is via input port 204.

Step (3) is a command from PC 70 to serial pattern generator 120 to generate evenly spaced square waves at a transmission speed of interest, e.g., 200 Mb/s.

Step (4) is a command from the PC 70 to the oscilloscope 250 to employ the normal mode, i.e., the persist mode, in which new waveforms are superimposed on old waveforms so as to produce an eye pattern.

Step (5) is a command from PC 70 to the oscilloscope 250 specifying receiver channel range (in volts/division, e.g., 0.02 volts/division) and offset ( the voltage corresponding to the center graticule of the oscilloscope, e.g., 0.0 volts).

Step (6) is a command from the PC 70 to the oscilloscope 250 to trigger on the leading edge of an input waveform, i.e., to display the waveform in response to the leading edge of the waveform.

Step (7) is a command from the PC 70 to the oscilloscope 250 in which the oscilloscope time base, i.e., nanoseconds/division (e.g., 10.0 nanoseconds/division), and delay, i.e., the amount of time the oscilloscope should delay before initiating a waveform trace (e.g., 0.0 nanosecond delay), are defined.

Step (8) displays a message on the PC 70 display requesting that the operator connect a 10× probe from oscilloscope channel 256 to the pin on the module socket 20 which corresponds to the transmitter non-inverting input (I), and to connect a 10× probe from oscilloscope channel 255 to the pin on the module socket 20 which corresponds to the transmitter inverting input (I-bar).

Step (9) is a command from the PC 70 to the oscilloscope 250 to employ the average mode, which means that the oscilloscope is to display waveforms consisting of points, each of which is the average of a current point and of a corresponding previous point, so as to smooth the waveforms.

Step (10) is a command from the PC 70 to the oscilloscope 250 to determine the upper and lower voltages of the electro-optic transducer 160.

Step (11) determines the amplitude of the waveform and compares it to the corresponding specification, e.g., greater than 0.04 volts.

Step (12) denotes a command from the PC 70 to the switch control unit 150 to set microwave switch 140 so that the output of serial pattern generator 120 will be communicated to output port 144 and to set optical switch 200 so that the input to the optical switch 200 is via input port 204.

Step (13) is a command from the PC 70 to the serial pattern generator 120 to generate the K28.5 pattern.

Step (14) is a command from the PC 70 to the oscilloscope 250 to employ the normal mode.

Step (15) is a command from the PC 70 to the oscilloscope 250 to trigger in response to clock pulses from the internal clock 130 of the serial pattern generator 120.

Step (16) is a command from the PC 70 to the oscilloscope 250 in which the oscilloscope time base, i.e., nanoseconds/division (e.g., 0.5 nanoseconds/division), and delay, i.e., the amount of time the oscilloscope should delay before initiating a waveform trace (e.g., 0.0 nanosecond delay), are defined.

Step (17) is a command from the PC 70 to the oscilloscope 250 in which the oscilloscope executes a built-in program to determine the jitter present in the waveform for channel 256. A command is then sent from the PC 70 to the oscilloscope 250 to return the value of measured jitter.

Step (18) compares the measured jitter result with the corresponding specification and displays the result.

Step (19) repeats steps 2 through 17 using oscilloscope channel 255.

Step (20) compares the measured jitter result for channel 255 with the corresponding specification to determine if the value should be saved and displays the result. The final data dependent jitter measurement is determined by taking the average jitter of the two channels.

With reference to Subroutine R, which relates to the duty cycle distortion calibration procedure, step (1) denotes a command from the PC 70 to the switch control unit 150 to set microwave switch 140 so that the output of serial pattern generator 120 will be communicated to output port 144 and to set optical switch 200 so that the input to the optical switch 200 is via input port 204.

Step (2) is a command from PC 70 to serial pattern generator 120 to generate evenly spaced square waves at a transmission speed of interest, e.g., 200 Mb/s.

Step (3) is a command from the PC 70 to the oscilloscope 250 to employ the normal mode, i.e., the persist mode, in which new waveforms are superimposed on old waveforms so as to produce an eye pattern.

Step (4) is a command from PC 70 to the oscilloscope 250 specifying receiver channel range (in volts/division, e.g., 0.02 volts/division) and offset (the voltage corresponding to the center graticule of the oscilloscope, e.g., 0.0 volts).

Step (5) is a command from the PC 70 to the oscilloscope 250 to trigger on the leading edge of an input waveform, i.e., to display the waveform in response to the leading edge of the waveform.

Step (6) is a command from the PC 70 to the oscilloscope 250 in which the oscilloscope time base, i.e., nanoseconds/division (e.g., 2.0 nanoseconds/division), and delay, i.e., the amount of time the oscilloscope should delay before initiating a waveform trace (e.g., −4.4 nanosecond delay), are defined.

Step (7) displays a message on the PC 70 display requesting that the operator connect a 10× probe from oscilloscope channel 256 to the pin on the module socket 20 which corresponds to the transmitter non-inverting input (I), and to connect a 10× probe from oscilloscope channel 255 to the pin on the module socket 20 which corresponds to the transmitter inverting input (I-bar).

Step (8) is a command from the PC 70 to the oscilloscope 250 to employ the average mode, which means that the oscilloscope is to display waveforms consisting of points, each of which is the average of a current point and of a corresponding previous point, so as to smooth the waveforms.

Step (9) is a command from the PC 70 to the oscilloscope 250 to determine the upper and lower voltages of the transmitter input signal I.

Step (10) determines the amplitude of the waveform and compares it to the corresponding specification, e.g., greater than 0.04 volts.

Step (11) is a command from the PC 70 to the oscilloscope 250 to employ the average mode.

Step (12) is a command from the PC 70 to the oscilloscope 250 to trigger on the leading edge of an input waveform.

Step (13) is a command from the PC 70 to the oscilloscope 250 to determine the upper and lower voltages of the transmitter input signal I-bar.

Step (14) determines the amplitude of the waveform and compares it to the corresponding specification, e.g., greater than 0.04 volts.

Step (15) is a command from the PC 70 to the oscilloscope 250 to subtract the two channels I minus I-bar.

Step (16) is a command from PC 70 to the oscilloscope 250 specifying receiver channel range ( in volts/division, e.g., 0.05 volts/division) and offset (the voltage corresponding to the center graticule of the oscilloscope, e.g., 0.0 volts).

Step (17) is a command from the PC 70 to the oscilloscope 250 to employ the average mode.

Step (18) involves a series of commands from the PC 70 to the oscilloscope 250 to measure the positive and negative widths of the waveform. Step (18a) is a command from the PC 70 to the oscilloscope 250 to measure the time between the first rising edge and the first falling edge of the waveform. If the result of this measurement is a positive value (step 18b), then measure the time between the first falling edge and the second rising edge (step 18c) to obtain the negative width. If the result of step 18a was a negative value (step 18d), then measure the time between the first rising edge and the second falling edge (step 18e) to obtain the positive width.

Step (19) calculates the duty cycle distortion from the equation:

$$duty\ cycle\ distortion = ((positive\ width) - (negative\ width))/2.0$$

Compare the value of duty cycle distortion with the corresponding specification to determine if the value should be saved and displays the result.

---

Subroutine A

Receiver Sensitivity

---

1) Set DUT voltage for the measurements
2) Set switches for receiver measurement
3) Set BER transmitter for square wave
4) Set scope to receiver channels
5) Set receiver channel range and offset
6) Trigger on waveform
7) Set Scope Time Base and Delay
8) Set scope to acquire average mode - 2 averages
9) Get the lower and upper receiver waveform voltages
10) Set switches for receiver measurement with CLOCK1 sync
11) Set BER transmitter for pseudo random pattern
12) Set BER receiver for pseudo random pattern
13) Set scope to acquire normal mode
14) Trigger on BER clock
15) Set Receiver Threshold to 0.0 volts
16) Set power meter units for dB
17) Set power meter reference for receiver measurement
18) Set power meter trigger for triggered mode
19) Measure Window width and power setting - Center is in RxWindowCen
    19a) Set Measure Period
    19b) Set Delay Generator
    19c) Set Receiver Estimated Laser power output level
    19d) Decrement power until receiver threshold is found
    19e) Get the size of the window
        19e-1) Set Measure Period
        19e-2) Set Delay Generator to estimated upper edge of window
        19e-3) Increment delay until errors occur
        19e-4) Set Delay Generator to estimated lower edge of window
        19e-5) Decrement delay until errors occur
        19e-6) Save the delay times
    19f) Calculate and save size of window and center of window
20) Set delay to −.7 ns from center of window
21) Adjust power level for BER between 1E-7 and 1E-8
    21a) Set Measure Period for 1 second
    21b) Do coarse adjustment
    21c) Check bit error rate
    21d) Get second bit error rate
    21e) Check bit error rate
    21f) Estimate power level for desired bit error rate
    21g) Do fine adjustment
22) Determine the 3 power levels to use
23) Save power levels for +−0.7 ns tests
24) Set Measure Period for 2 seconds
25) Measure Bit Error Rate for all three power levels
26) Calculate best fit and extrapolate to BER 1E-15
27) Add the penalty for not using 4:1 extinction ratio
28) Get Correlation and Slope values
29) Check Sensitivity for PASSED/FAILED

---

Subroutine A -continued

Receiver Sensitivity

---

30) Set delay to +.7 ns from center of window
31) Adjust power level for BER between 1E-7 and 1E-8
    31a) Set Measure Period for 1 second
    31b) Do coarse adjustment
    31c) Check bit error rate
    31d) Get second bit error rate
    31e) Check bit error rate
    31f) Estimate power level for desired bit error rate
    31g) Do fine adjustment
32) Determine the 3 power levels to use
33) Set Measure Period for 2 seconds
34) Measure Bit Error Rate for all three power levels
35) Calculate best fit and extrapolate to BER 1E-15
36) Add the penalty for not using 4:1 extinction ratio
37) Get Correlation and Slope values
38) Check Sensitivity for PASSED/FAILED

---

Subroutine B

Receiver Pulse Width Distortion

---

1) Set DUT voltage for the PWD measurement
2) Set switches for receiver measurement
3) Switch BER transmitter to square wave pattern
4) Set scope to receiver channels
5) Set receiver channels range and offset (DC couple)
6) Trigger on waveform
7) Set Scope Time Base and Delay
8) Set power meter units for dB
9) Set power meter reference for receiver measurement
10) Set power meter trigger for triggered mode
11) Set receiver power level
12) Set scope to acquire average mode - 16 averages
13) Measure top and bottom of waveform
14) Check for sufficient amplitude
15) Get positive and negative widths of waveform in nanoseconds
    15a) Get first pulse
    15b) Check if positive width
    15c) Get negative width
    15d) Check if negative width
    15e) Get positive width
16) Calculate Pulse Width Distortion percent

---

Subroutine C

Receiver Signal Detect Threshold

---

1) Set DUT supply voltage
2) Set switches for receiver measurement
3) Set BER transmitter for pseudo random pattern
4) Set power meter units for dB
5) Set power meter reference for receiver measurement
6) Set power meter trigger for triggered mode
7) Find the Receiver Signal Detect Threshold
    7a) Decrease power until Signal Detect indicates no signal is being detected
8) Save Receiver Signal Detect Threshold
9) Add the penalty for not using 4:1 extinction ratio
10) Check Receiver Signal Detect Threshold power for PASSED/FAILED

---

Subroutine D

Receiver Signal Detect Assert/Deassert Times

1) Set DUT supply voltage
2) Set switches for receiver measurement with Gate sync
3) Turn on BERT gate input
4) Set Gate input channel range, offset, and coupling
5) Set Signal Detect channel range, offset, and coupling 6) Set Scope Trigger for gate channel
7) Set Scope Time Base and Delay
8) Set power meter units for dB
9) Set Optical Power Meter Reference for Receiver
10) Set power meter trigger for triggered mode
11) Set power level
12) Set scope to average mode with 2 channels—32 averages
13) Get the lower and upper Gate Input waveform voltages
14) Get the lower and upper Signal Detect waveform voltages
15) Get times of first positive edges
16) Convert to microseconds and save
17) Check Receiver Signal Detect Assert Time for PASSED/FAILED
18) Get times of first negative edges
19) Convert to microseconds and save
20) Check Receiver Signal Detect Deassert Time for PASSED/FAILED Subroutine E Transmitter Average Power
1) Set DUT supply voltage
2) Set switches for transmitter measurement with CLOCK1 sync
3) Set BER transmitter for pseudorandom pattern
4) Set power meter units for dB
5) Set power meter reference for transmitter measurement
6) Set power meter trigger for continuous
7) Measure Average Power
8) Check for dead transmitter
9) Check Average Power for PASSED/FAILED Subroutine F Transmitter Rise/Fall Time
1) Set DUT supply voltage
2) Set switches for transmitter measurement
3) Switch serial test pattern generator to Square Wave
4) Set transmitter channel range, offset, and coupling
5) Trigger on waveform
6) Set Scope Time Ease and Delay
7) Set scope to acquire average mode—4 averages
8) Measure peak amplitude of waveform
9) Check for sufficient amplitude
10) Measure baseline and topline of waveform
11) Measure Rise time between 20% and 80% values
12) Check Rise time for PASSED/FAILED
13) Measure Fall Time using rise time voltage values
14) Check Fall time for PASSED/FAILED Subroutine G Transmitter Extinction Ratio
1) Set DUT supply voltage
2) Set switches for transmitter measurement
3) Set BER transmitter for square wave pattern
4) Set transmitter channel range, offset, and coupling
5) Trigger on waveform
6) Set Scope Time Base and Delay
7) Set scope to average mode—4 averages
8) Measure peak amplitude of waveform
9) Check for sufficient amplitude
10) Measure baseline and topline of waveform
11) Calculate extinction ratio
12) Check Extinction Ratio for PASSED/FAILED Subroutine H Transmitter Duty Cycle Distortion 1) Set DUT supply voltage
2) Set switches for transmitter measurement
3) Switch BER transmitter to square wave pattern
4) Set transmitter channel range, offset, and coupling
5) Trigger on waveform
6) Set Scope Time Base and Delay
7) Set scope to acquire average mode - 8 averages
8) Measure top and bottom of waveform
9) Check for sufficient amplitude
10) Use 50% point of 0.0. AC coupled
11) Get positive and negative widths of waveform in nanoseconds
   11a) Get first pulse width
   11b) If positive width
      11b-1) Get negative width
   11c) If negative width
      11c-1) Get positive width
12) Calculate Duty Cycle Distortion in picoseconds and check results Subroutine I Transmitter Data Dependent Jitter 1) Set DUT supply voltage
2) Set switches for transmitter measurement
3) Switch BER transmitter to square wave pattern
4) Set Scope Time Base and Delay
5) Set transmitter channel range, offset, and coupling
6) Trigger on waveform
7) Set scope to acquire average mode - 2 averages
8) Measure top and bottom of waveform
9) Check for sufficient amplitude
10) Switch serial test pattern to K28.5 (Data Dependent Jitter Pattern)
11) Set scope to normal acquisition
12) Set Scope Trigger offset and slope
13) Use scope jitter routine to obtain jitter
   13a) Set scope to display to color graded
   13b) Set absolute ranges
   13c) Set left and right zones
   13d) Measure top and bottom of waveform
   13e) Loop until the number of points is equal to or greater than desired
   13f) Get jitter measurement
   13g) Convert to picoseconds
14) Check jitter results Subroutine J Optical Power Meter Calibration
1) Initialize the Optical Power Meter for Calibration
2) Insert just the optical head calibration factor
3) Set power meter wavelength
4) Get the Floor Reference Power Meter reading
5) Get the Power Meter reading of the Floor Reference Power
6) Calculate power Delta
7) Insert new meter calibration factor
8) Re-measure Reference Power on the Power Meter
9) If measurement PASSED, save the new meter correction factor Subroutine K Transmitter Fixture Calibration
1) Initialize meter with calibration factor
2) Set power meter trigger for continuous 3) Set meter reference to 0.0
4) Set power meter wavelength
5) Measure the Floor Reference Power through the Transmitter Reference Cable
6) Calculate the Transmitter Fixture/Fiber Loss
7) Display results Subroutine L Transmitter Link Calibration
1) Set optical switches to read Transmitter link power
2) Initialize meter with calibration factor
3) Set power meter trigger for continuous
4) Set meter reference to 0.0
5) Set power meter wavelength
6) Measure the Floor Reference Power through the Tx Fixture/Fiber and Link
7) Calculate Transmitter Link Delta and Loss
8) Set new Transmitter Reference
9) Measure the Floor Reference Power through the Tx Reference Cable and Tx Link with the reference set
10) If measurement PASSED, save the new Tx Link Loss Subroutine M Receiver Link Calibration
1) Set switches for receiver measurement
2) Initialize meter with calibration factor
3) Set power meter trigger for continuous
4) Set meter reference to 0.0
5) Set power meter wavelength
6) Set attenuator to 0.0
7) Measure laser power out of receiver duplex connector
8) Measure Laser Power of 10% leg of splitter
9) Calculate the difference
10) Set the Power Meter Reference to the difference
11) Measure Laser Power to DUT Receiver through splitter with reference set
12) If measurement PASSED, save the new Rx Link Loss Subroutine N Frequency Generator Calibration 1) Determine minimum and maximum limits
2) Set switches for transmitter measurement
3) Set scope to acquire normal mode for initialization
4) Set channel range, offset, and coupling
5) Trigger on channel
6) Set Scope Time Base and Delay
7) Set scope to acquire average mode - 4 averages
8) Prompt operator to connect frequency generator to scope
9) Loop on calibration information
    9a) Check frequency
    9b) Check amplitude
    9c) Check offset
    9d) Check keyboard termination character Subroutine O Oscilloscope Calibration
1) Calibrate channel L1 O/E converter
2) Calibrate channel C1
3) Calibrate channel C2
4) Calibrate channel R1
5) Calibrate channel R2
6) Display calibration result Subroutine P Laser Source Extinction Ratio Calibration
1) Set switches for transmitter measurement
2) Set Anristu to drive LASER source
3) Set BER transmitter for 100 MHz square wave
4) Set scope to acquire normal mode
5) Set transmitter channel range and offset
6) Trigger on waveform
7) Set Scope Time Base and Delay
8) Set power meter units for dB
9) Set power meter reference for receiver measurement
10) Set power meter trigger for continuous mode
11) Ensure LASER is off
12) Prompt operator to make fiber connections
13) Turn LASER source on
14) Set scope to acquire average mode—32 averages
15) Measure amplitude of waveform
16) Check for sufficient amplitude
17) Calculate extinction ratio
18) Display Extinction Ratio results Subroutine Q Data Dependent Jitter Calibration
1) First part of DDJ Cal using Channel C1
2) Set switches for transmitter measurement
3) Switch BER transmitter to square wave pattern
4) Set scope to normal acquisition while being initialized
5) Set channel range, offset, and coupling
6) Trigger on BER clock
7) Set Scope Time Base and Delay
8) Prompt operator to make probe connections
9) Set scope to acquire average mode—4 average
10) Measure top and bottom of waveform
11) Check for sufficient amplitude
12) Set switches for transmitter measurement with CLOCK1 sync
13) Switch serial test pattern to K28.5 (Data Dependent Jitter Pattern)
14) Set scope to normal acquisition
15) Set Scope Trigger offset and slope for CLOCK1 Sync
16) Set Scope Trigger Base and Delay
17) Use scope jitter routine to obtain jitter
18) Check jitter results
19) Repeat using Channel C2
20) Check return code and display results Subroutine R Duty Cycle Distortion Calibration 1) Set switches for transmitter measurement
2) Switch BER transmitter to square wave pattern
3) Set scope channel to normal acquisition while being initialized
4) Set channel range, offset, and coupling
5) Trigger on waveform
6) Set Scope Time Base and Delay
7) Prompt operator to make probe connections
8) Set channel to test amplitude - 4 averages
9) Measure top and bottom of waveform
10) Check for sufficient amplitude
11) Set channel to test amplitude - 4 averages
12) Trigger on waveform
13) Measure top and bottom of waveform
14) Check for sufficient amplitude
15) Set scope subtract function
16) Set channel range, offset, and coupling
17) Set scope to acquire average mode - 16 averages.
18) Get positive and negative widths of waveform in nanoseconds -continued Subroutine R Duty Cycle Distortion Calibration 18a) Get first pulse
    18b) Check if positive width
    18c) Get negative width
    18d) Check if negative width
    18e) Get positive width
19) Calculate Duty Cycle Distortion in picoseconds and check result

We claim:

1. A method for testing an electro-optic module having an electro-optic transmitter, comprising the steps of:

providing an automated test system that receives electro-optic modules for test; and initiating a test sequence of the automated test system that performs the steps of providing uniform, evenly spaced square wave electrical pulses at a transmission speed of interest from the automated test system to the electro-optic transmitter of the electro-optic module, such that the digital optical signal produced by the electro-optic transmitter comprises a sequence of square wave pulses that alternate between a relatively high output power and a relatively low output power, and determining a transmitter duty cycle distortion defined as the difference in pulse width between a positive optical signal pulse and a negative optical signal pulse, the pulse width measured at a voltage level half-way between the pulse top and the pulse bottom.

2. An automatic test system for measuring the transmitter duty cycle distortion of an electro-optic module having an electro-optic transmitter, comprising:

a central processor unit that controls an automated test procedure in response to a test command to determine transmitter duty cycle distortion of an electro-optic module under test;

a pattern generator that generates a pseudo-random pattern of data signals in response to a command from the central processor unit;

a switch that provides the data signals to the electro-optic module, thereby causing a pseudo-random digital optical signal to be generated by the electro-optic transmitter of the electro-optic module corresponding to the data signals; and an oscilloscope that receives the digital optical signal, measures a baseline and topline of the digital optical signal, and determines the transmitter duty cycle distortion, wherein the duty cycle distortion is defined to be the difference in pulse width between a positive optical signal pulse and a negative optical signal pulse, the pulse width measured at a voltage level half-way between the pulse top and the pulse bottom as the electro-optic transmitter switches between a relatively high optical output power and a relatively low optical output power.

3. A method for testing an electro-optic module which includes an electro-optic transmitter, comprising the steps of:

providing an automated test system for testing electro-optic modules that include electro-optic transmitters;

connecting an electro-optic module that includes an electro-optic transmitter to the automated test system; and automatically measuring a transmitter duty cycle distortion associated with said electro-optic transmitter, wherein the electro-optic transmitter receives pulses from the automated test system and in response produces a digital optical signal having square wave pulses, and transmitter duty cycle distortion is defined as the difference in pulse width between a positive optical signal pulse and a negative optical signal pulse, the pulse width measured at a voltage level half-way between the pulse top and the pulse bottom;

wherein the step of automatically measuring further comprises providing uniform, evenly spaced square wave electrical pulses at a transmission speed of interest from the automated test system to the electro-optic transmitter of the electro-optic module, such that the digital optical signal produced by the electro-optic transmitter comprises a sequence of square wave pulses;

wherein the step of automatically measuring further includes the step of displaying the square wave pulses of the digital optical signal of the electro-optic module on an oscilloscope display of the automated test system and automatically selecting a channel range and offset of the oscilloscope display; and wherein the automated test system determines average output power of a predetermined number of square wave pulses and measures peak amplitude of the square wave pulses relative to the determined average output power so as to confirm that the square wave pulses have sufficient amplitude for the measurement.

* * * * *

UNITED STATES PATENT AND TRADEMARK OFFICE
CERTIFICATE OF CORRECTION

PATENT NO. : 5,617,238
DATED : April 1, 1997
INVENTOR(S) : Bogdan et al

It is certified that error appears in the above-identified patent and that said Letters Patent is hereby corrected as shown below:

On the title page: Item [75] should read as
--David C. Bogdan, Vestal; Donald L. Pearl, Endwell; David T. Pribula, Port Crane, all of N.Y.; Nancy R. Aulet, Austin, Tx.; Muhammed I. Hussain, Hopewell Junction; George W. Hutt, Hyde Park, both of N.Y.--

Signed and Sealed this

Twenty-sixth Day of May, 1998

Attest:

BRUCE LEHMAN

Attesting Officer          Commissioner of Patents and Trademarks